(12) United States Patent
Schwarz et al.

(10) Patent No.: US 10,760,488 B2
(45) Date of Patent: Sep. 1, 2020

(54) GEARED TURBOFAN ENGINE GEARBOX ARRANGEMENT

(71) Applicant: United Technologies Corporation, Farmington, CT (US)

(72) Inventors: Frederick M. Schwarz, Glastonbury, CT (US); William G. Sheridan, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1082 days.

(21) Appl. No.: 15/013,125

(22) Filed: Feb. 2, 2016

(65) Prior Publication Data
US 2016/0153356 A1 Jun. 2, 2016

Related U.S. Application Data

(60) Continuation of application No. 14/496,574, filed on Sep. 25, 2014, now Pat. No. 9,500,126, which is a
(Continued)

(51) Int. Cl.
*F02C 1/00* (2006.01)
*F02C 7/06* (2006.01)
(Continued)

(52) U.S. Cl.
CPC ............... *F02C 7/06* (2013.01); *F01D 5/02* (2013.01); *F01D 5/06* (2013.01); *F01D 9/06* (2013.01); *F01D 17/105* (2013.01); *F02C 3/04* (2013.01); *F02C 3/06* (2013.01); *F02C 3/10* (2013.01); *F02C 3/107* (2013.01); *F02C 7/28* (2013.01);
(Continued)

(58) Field of Classification Search
CPC ........................ F02C 7/04; B64D 2033/0286
See application file for complete search history.

(56) References Cited

U.S. PATENT DOCUMENTS

| 2,258,792 A | 4/1941 | New |
| 2,936,655 A | 5/1960 | Peterson et al. |

(Continued)

FOREIGN PATENT DOCUMENTS

| EP | 0791383 | 8/1997 |
| EP | 1142850 | 10/2001 |

(Continued)

OTHER PUBLICATIONS

International Search Report for PCT Application No. PCT/US2014/057434, completed Dec. 12, 2014.
(Continued)

*Primary Examiner* — Gerald L Sung
(74) *Attorney, Agent, or Firm* — Carlson, Gaskey & Olds, P.C.

(57) ABSTRACT

A gas turbine engine according to an example of the present disclosure includes, among other things, a fan section having a plurality of fan blades. The plurality of fan blades has a peak tip radius Rt and an inboard leading edge radius Rh at a first inboard boundary of a first flowpath. A core engine includes a first turbine configured to drive a first compressor, and a fan drive turbine configured to drive the fan section. A method of designing a gas turbine engine is also disclosed.

23 Claims, 6 Drawing Sheets

Related U.S. Application Data division of application No. 14/087,471, filed on Nov. 22, 2013, now Pat. No. 8,869,504.

(51) Int. Cl.
| | |
|---|---|
| F02K 1/09 | (2006.01) |
| F02C 7/36 | (2006.01) |
| F02C 3/107 | (2006.01) |
| F02K 3/04 | (2006.01) |
| F01D 5/02 | (2006.01) |
| F01D 9/06 | (2006.01) |
| F01D 17/10 | (2006.01) |
| F02C 3/06 | (2006.01) |
| F02C 3/10 | (2006.01) |
| F04D 29/32 | (2006.01) |
| F01D 5/06 | (2006.01) |
| F02C 3/04 | (2006.01) |
| F02C 7/28 | (2006.01) |
| F02C 9/18 | (2006.01) |
| F02K 1/06 | (2006.01) |
| F02K 3/06 | (2006.01) |
| F04D 29/38 | (2006.01) |
| F16H 1/28 | (2006.01) |

(52) U.S. Cl.
CPC ............... *F02C 7/36* (2013.01); *F02C 9/18* (2013.01); *F02K 1/06* (2013.01); *F02K 1/09* (2013.01); *F02K 3/04* (2013.01); *F02K 3/06* (2013.01); *F04D 29/321* (2013.01); *F04D 29/325* (2013.01); *F04D 29/38* (2013.01); *F16H 1/28* (2013.01); *F05D 2220/32* (2013.01); *F05D 2220/36* (2013.01); *F05D 2230/60* (2013.01); *F05D 2240/12* (2013.01); *F05D 2240/24* (2013.01); *F05D 2240/35* (2013.01); *F05D 2240/52* (2013.01); *F05D 2240/54* (2013.01); *F05D 2240/60* (2013.01); *F05D 2260/40311* (2013.01)

(56) References Cited

U.S. PATENT DOCUMENTS

| | | | |
|---|---|---|---|
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,664,612 A | 5/1972 | Skidmore et al. | |
| 3,747,343 A | 7/1973 | Rosen | |
| 3,754,484 A | 8/1973 | Roberts | |
| 3,820,719 A | 6/1974 | Clark | |
| 3,892,358 A | 7/1975 | Gisslen | |
| 3,932,058 A | 1/1976 | Hamer et al. | |
| 3,935,558 A | 1/1976 | Miller et al. | |
| 3,988,889 A | 11/1976 | Chamay et al. | |
| 4,130,872 A | 12/1978 | Harloff | |
| 4,284,174 A | 8/1981 | Salvana et al. | |
| 4,289,360 A | 9/1981 | Zirin | |
| 4,478,551 A | 10/1984 | Honeycutt, Jr. et al. | |
| 4,595,340 A | 6/1986 | Klassen et al. | |
| 4,649,114 A | 3/1987 | Miltenburger et al. | |
| 4,696,156 A | 9/1987 | Burr et al. | |
| 4,936,748 A | 6/1990 | Adamson et al. | |
| 4,979,362 A | 12/1990 | Vershure, Jr. | |
| 5,102,379 A | 4/1992 | Pagluica et al. | |
| 5,141,400 A | 8/1992 | Murphy et al. | |
| 5,317,877 A | 6/1994 | Stuart | |
| 5,361,580 A | 11/1994 | Ciokajlo et al. | |
| 5,433,674 A | 7/1995 | Sheridan et al. | |
| 5,443,365 A | 8/1995 | Ingling et al. | |
| 5,447,411 A | 9/1995 | Curley et al. | |
| 5,466,198 A | 11/1995 | McKibbin et al. | |
| 5,524,847 A | 6/1996 | Brodell et al. | |
| 5,677,060 A | 10/1997 | Terentieva et al. | |
| 5,778,659 A | 7/1998 | Duesler | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,106,233 A | 8/2000 | Walker et al. | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,478,545 B2 | 11/2002 | Crall et al. | |
| 6,517,341 B1 | 2/2003 | Brun et al. | |
| 6,524,072 B1 | 2/2003 | Brownell et al. | |
| 6,607,165 B1 | 8/2003 | Manteiga et al. | |
| 6,709,492 B1 | 3/2004 | Spadaccini et al. | |
| 6,814,541 B2 | 11/2004 | Evans et al. | |
| 7,021,042 B2 | 4/2006 | Law | |
| 7,144,221 B2 * | 12/2006 | Giffin | F01D 5/022 |
| | | | 416/189 |
| 7,328,580 B2 | 2/2008 | Lee et al. | |
| 7,374,403 B2 | 5/2008 | Decker et al. | |
| 7,445,433 B2 | 11/2008 | Chivers et al. | |
| 7,591,754 B2 | 9/2009 | Duong et al. | |
| 7,662,059 B2 | 2/2010 | McCune | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,926,260 B2 | 4/2011 | Sheridan et al. | |
| 7,997,868 B1 | 8/2011 | Liang et al. | |
| 8,205,432 B2 | 6/2012 | Sheridan | |
| 10,288,083 B2 * | 5/2019 | Miller | F04D 27/002 |
| 2003/0163983 A1 * | 9/2003 | Seda | F01D 5/03 |
| | | | 60/226.1 |
| 2006/0228206 A1 | 10/2006 | Decker et al. | |
| 2007/0151258 A1 | 7/2007 | Gaines et al. | |
| 2008/0003096 A1 | 1/2008 | Kohli et al. | |
| 2008/0098717 A1 | 5/2008 | Orlando et al. | |
| 2008/0116009 A1 | 5/2008 | Sheridan et al. | |
| 2008/0317588 A1 | 12/2008 | Grabowski et al. | |
| 2009/0056343 A1 | 3/2009 | Suciu et al. | |
| 2009/0081039 A1 * | 3/2009 | McCune | F02C 7/04 |
| | | | 415/214.1 |
| 2009/0185908 A1 | 7/2009 | Chung et al. | |
| 2009/0304473 A1 | 12/2009 | Holze et al. | |
| 2009/0304518 A1 | 12/2009 | Kodama et al. | |
| 2009/0314881 A1 | 12/2009 | Suciu et al. | |
| 2010/0105516 A1 | 4/2010 | Sheridan et al. | |
| 2010/0148396 A1 | 6/2010 | Xie et al. | |
| 2010/0212281 A1 | 8/2010 | Sheridan | |
| 2010/0218483 A1 | 9/2010 | Smith | |
| 2010/0331139 A1 | 12/2010 | McCune | |
| 2011/0008165 A1 * | 1/2011 | Ottow | F01D 11/005 |
| | | | 415/213.1 |
| 2011/0097205 A1 * | 4/2011 | Maddaus | F01D 5/141 |
| | | | 415/208.2 |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |
| 2013/0025257 A1 | 1/2013 | Suciu et al. | |

FOREIGN PATENT DOCUMENTS

| | | |
|---|---|---|
| EP | 1921256 | 5/2008 |
| EP | 2551489 | 1/2013 |
| EP | 3008323 | 4/2016 |
| GB | 1516041 | 6/1978 |
| GB | 2041090 | 9/1980 |
| GB | 2426792 | 12/2006 |
| GB | 2440345 | 1/2008 |
| WO | 2007038674 | 4/2007 |
| WO | 2014197155 | 12/2014 |

(56) References Cited

OTHER PUBLICATIONS

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K. Gu, C. and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

Walsh, Philip, et al. (2006). Gas Turbine Performance, John Wiley & Sons, Incorporated, 2006. ProQuest Ebook Central.

Extended European Search Report for European Patent Application No. 14864738.1 completed Jun. 20, 2017.

NASA Conference Publication. Quiet, powered-lift propulsion. Cleveland, Ohio. Nov. 14-15, 1978.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

(56) References Cited

OTHER PUBLICATIONS

NASA Conference Publication. (1978). CTOL transport technology. NASA-CP-2036-PT-1. Jun. 1, 1978. pp. 1-531.
Kandebo, S.W. (1998). Geared-Turbofan engine design targets cost, complexity. Aviation Week & Space Technology, 148(8). p. 34-5.
Davis, D.G.M. (1973). Variable-pitch fans: Progress in Britain. Flight International. Apr. 19, 1973. pp. 615-7.
Levintan, R.M. (1975). Q-Fan demonstrator engine. Journal of Aircraft. vol. 12( 8). Aug. 1975. pp. 658-63.
Technical Report. (1975). Quiet Clean Short-haul Experimental Engine (QCSEE) UTW fan preliminary design. NASA-CR-134842. Feb. 1, 1975. pp. 1-98.
Aerospace Information Report. (2008). Advanced ducted propulsor in-flight thrust determination. SAE International AIR5450. Aug. 2008. p. 1-392.
Daggett, D.L., Brown, S.T., and Kawai, R.T. (2003). Ultra-efficient engine diameter study. NASA/CR-2003-212309. May 2003. pp. 1-52.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-6 and 764-71.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubircant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-38.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-8.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Edwards, T. And Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_pffe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimension. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, JR., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479,

(56) References Cited

OTHER PUBLICATIONS 517-520, 563-565, 630-632, 668-670, 673-675, 682-685, 697-705, 726-727, 731-732, 802-805, 828-830 and appendices.

Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.

Datasheet. CF6-80C2 high-bypass turbofan engines. Retreived from https://geaviation.com/sites/default/files/datasheet-CF6-80C2.pdf.

Salemme, C.T. and Murphy, G.C. (1979). Metal spar/superhybrid shell composite fan blades. Prepared for NASA. NASA-CR-159594. Aug. 1979 pp. 1-127.

"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".

Datasheet. Genx™ high bypass turbofan engines. Retreived from: https://www.geaviation.com/sites/default/files/datasheet-genx.pdf.

Winn, A. (Ed). (1990). Wide Chord Fan Club. Flight International, 4217(137). May 23-29, 1990. pp. 34-38.

Parker, R.G. and Lin, J. (2001). Modeling, modal properties, and mesh stiffness variation instabilities of planetary gears. Prepared for NASA. NASA/CR-2001-210939. May 2001. pp. 1-111.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Dudley, D.W., Ed. (1962). Handbook of practical gear design. Lancaster, PA: Technomic Publishing Company, Inc. pp. 3.96-3.102 and 8.12-8.18.

Dudley, D.W., Ed. (1962). Gear handbook. New York, NY: McGraw-Hill. pp. 3.14-3.18 and 12.7-12.21.

Whitaker, R. (1982). ALF 502: plugging the turbofan gap. Flight International, p. 237-241, Jan. 30, 1982.

Munt, R. (1981). Aircraft technology assessment: Progress in low emissions engine. Technical Report. May 1981. pp. 1-171.

Waters, M.H. and Schairer, E.T. (1977). Analysis of turbofan propulsion system weight and dimensions. NASA Technical Memorandum. Jan. 1977. pp. 1-65.

Avco Lycoming Divison. ALF 502L Maintenance Manual. Apr. 1981. pp. 1-118.

Type Certificate Data Sheet No. E6NE. Department of Transportation Federal Aviation Administration. Jun. 7, 2002. pp. 1-10.

Trembley, Jr., H.F. (1977). Determination of effects of ambient conditions on aircraft engine emissions. Prepared for Environmental Protection Agency. Ann Arbor, Michigan. Sep. 1977 pp. 1-256.

Honeywell LF502. Jane's Aero-engines, Aero-engines—Turbofan. Feb. 9, 2012.

Honeywell LF502. Jane's Aero-engines, Aero-engines—Turbofan. Aug. 17, 2016.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Rauch, D. (1972). Design study of an air pump and integral lift engine ALF-504 using the Lycoming 502 core. Prepare for NASA. Jul. 1972. pp. 1-182.

Dassault Falcon 900EX Easy Systems Summary. Retrieved from: http://www.smartcockpit.com/docs/F900EX-Engines.pdf pp. 1-31.

Honeywell TFE731 Pilot Tips. pp. 1-143.

Honeywell TFE731-5AR to -5BR Engine Conversion Program. Sep. 2005. pp. 1-4.

Garret TFE731 Turbofan Engine (CAT C). Chapter 79: Lubrciation System. TTFE731 Issue 2. 2010. pp. 1-24.

McArdle, J.G. (1979). Static test-stand performance of the YF-102 turbofan engine with several exhaust configurations for the quiet short-haul research aircraft (QSRA). Nasa Technical Paper. Nov. 1979. pp. 1-68.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

Declaration of Reza Abhari. In re U.S. Pat. No. 8,695,920. Executed Nov. 30. pp. 1-67.

Declaration of Reza Abhari. In re U.S. Pat. No. 8,448,895. Executed Nov. 28. pp. 1-81.

Declaration of Reza Abhari. In re U.S. Pat. No. 8,695,920, claims 1-4, 7-14, 17 and 19. Executed Nov. 29. pp. 1-102.

Declaration of Dr. Magdy Attia. In re U.S. Pat. No. 8,313,280. Executed Oct. 21, 2016. pp. 1-88.

Lord, W.K., MacMartin, D.G., and Tillman, T.G. (2000). Flow control opportunities in gas turbine engines. American Institute of Aeronautics and Astronautics. pp. 1-15.

Daly, M. Ed. (2010). Jane's Aero-Engine. Issue Twenty-seven. Mar. 2010. p. 633-636.

Roux, E. (2007). Turbofan and turbojet engines database handbook. Editions Elodie Roux. Blagnac: France. pp. 1-595.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Declaration of Dr. Magdy Attia. In re U.S. Pat. No. 8,517,668. Executed Dec. 8, 2016. pp. 1-81.

Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.

U.S. Department of Transportation: Federal Aviation Administration Advisory Circular. Standard operating procedures for flight deck crewmembers. Dated: Feb. 27, 2003.. p. 1-6 and Appendices.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Vasudevan, A.K. and Petrovic, J.J. (1992). A comparative overview of molybedenum disilicide composites. Materials Science and Engineering, A155, 1992. pp. 1-17.

Clarke, D.R. and Levi, C.G. (2003). Materials design for the next generation thermal barrier coatings. Annual. Rev. Mater. Res. vol. 33. 2003. pp. 383-417.

(56) References Cited

OTHER PUBLICATIONS

Lee, K.N. (2000). Current status of environmental barrier coatings for Si-Based ceramics. Surface and Coatings Technology 133-134, 2000. pp. 1-7.

Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D.M. (1992). MoSi2 and other silicides as high temperature structural materials. Superalloys 1992. The Minerals, Metals, & Materials Society. pp. 409-422.

Zhao, J.C. and Westbrook, J.H. (2003). Ultrahigh-temperature materials for jet engines. MRS Bulletin. vol. 28 (9). Sep. 2003. pp. 622-630.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Jacobson, N.S. (1993). Corrosion of silicon-based ceramics in combustion environments. J. Am. Ceram. Soc. 76 (1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Dudley, D.W., Ed. (1994). Practical gear design. New York, NY: McGraw-Hill. pp. 119-124.

Product Brochure. Garrett TFE731. Allied Signal. Copyright 1987. pp. 1-24.

Honeywell Learjet 31 and 35/36 TFE731-2 to 2C Engine Upgrade Program. Sep. 2005. pp. 1-4.

Honeywell Sabreliner 65 TFE731-3 to -3D Engine Upgrade Program. Oct. 2005. pp. 1-4.

U.S. Department of Transportation: Federal Aviation Administration Type Certificate Data Sheet No. E6WE. Dated: May 9, 2000. p. 1.

Kurzke, J. (2012). GasTurb 12: Design and off-design performance of gas turbines. Retrieved from: https://www.scribd.com/document/153900429/GasTurb-12.

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.

Riegler, C., and Bichlmaier, C. (2007). The geared turbofan technology—Opportunities, challenges and readiness status. Porceedings CEAS. Sep. 10-13, 2007. Berlin, Germany. pp. 1-12.

About GasTurb. Retrieved Jun. 26, 2018 from: http://gasturb.de/about-gasturb.html\.

Kurzke, J. (2001). GasTurb 9: A program to calculate design and off-design performance of gas turbines. Retrieved from: https://www.scribd.com/document/92384867/GasTurb9Manual.

Tummers, B. (2006). DataThief III. Retrieved from: https://datathief.org/DatathiefManual.pdf pp. 1-52.

Manual. Student's Guide to Learning SolidWorks Software. Dassault Systemes—SolidWorks Corporation. pp. 1-156.

Macisaac, B. and Langston, R. (2011). Gas turbine propulsion systems. Chichester, West Sussex: John Wiley & Sons, Ltd. pp. 260-265.

Datasheet. CFM56-5B for the Airbus A320ceo family and CFM56-7B for the Boeing 737 family. https://www.cfmaeroengines.com/.

Turner, M. G., Norris, A., and Veres, J.P. (2004). High-fidelity three-dimensional simulation of the GE90. NASA/TM-2004-212981. pp. 1-18.

Defeo, A. and Kulina, M. (1977). Quiet clean short-haul experimental engine (QCSEE) main reduction gears detailed design final report. Prepared for NASA. NASA-CR-134872. Jul. 1977. pp. 1-221.

Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.

Singh, A. (2005). Application of a system level model to study the planetary load sharing behavior. Jounal of Mechanical Design. vol. 127. May 2005. pp. 469-476.

Smith-Boyd, L. and Pike, J. (1986). Expansion of epicyclic gear dynamic analysis program. Prepared for NASA. NASA CR-179563. Aug. 1986. pp. 1-98.

Wikipedia. Torsion spring. Retreived Jun. 29, 2018 from: https://en.wikipedia.org/wiki/Torsion_spring.

AGMA Standard (2006). Design manual for enclosed epicyclic gear drives. Alexandria, VA: American Gear Manufacturers Association. pp. 1-104.

AGMA Standard (1997). Design and selection of components for enclosed gear drives. lexandria, VA: American Gear Manufacturers Association. pp. 1-48.

(56) References Cited

OTHER PUBLICATIONS

Daly, M. Ed. (2007). Jane's Aero-Engine. Issue Twenty-three. Mar. 2008. p. 707-12.
AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study—vol. 2. NASA CR-174766. Oct. 1983. pp. 1-118.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.

Mattingly, J.D. (1996). Elements of gas turbine propulsion. New York, New York: McGraw-Hill, Inc. pp. 1-18, 60-62, 223-234, 462-479, 517-520, 757-767, and 862-864.
Johnston, R.P., Hirschkron, R., Koch, C.C., Neitzel, R.E, and Vinson, P.W. (1978). Energy efficient engine: Preliminary design and integration study—final report. NASA CR-135444. Sep. 1978. pp. 1-401.
Johnston, R.P. and Hemsworth, M.C. (1978). Energy efficient engine preliminary design and integration studies. Jun. 1, 1978. pp. 1-28.
Awker, R.W. (1986). Evaluation of propfan propulsion applied to general aviation. NASA CR-175020. Mar. 1, 1986. pp. 1-140.
Howe, D.C. and Wynosky, T.A. (1985). Energy efficient engine program advanced turbofan nacelle definition study. NASA CR-174942. May 1, 1985. pp. 174.
Singh, B. (1986). Small engine component technology (SECT) study. NASA CR-175079. Mar. 1, 1986. pp. 1-102.
Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.
Gliebe, P.R., Ho, P.Y., and Mani, R. (1995). UHB engine fan and broadband noise reduction study. NASA CR-198357. Jun. 1995. pp. 1-48.
Holcombe, V. (2003). Aero-Propulsion Technology (APT) task V low noise ADP engine definition study. NASA CR-2003-212521. Oct. 1, 2003. pp. 1-73.
Sutliff, D. (2005). Rotating rake turbofan duct mode measurement system. NASA TM-2005-213828. Oct. 1, 2005. pp. 1-34.
Petition for Inter Partes Review of U.S. Appl. No. 9,709,070. General Electric Company, Petitioner, v. United Technologies Corporation, Patent Owner. IPR2020-00083. Oct. 23, 2019.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.
Walsh, P.P. and Fletcher, P. (2004). Gas turbine performance, 2nd Edition. Oxford, UK: Blackwell Science. pp. 186-91.
Koff, B.L. (2003). Gas turbine technology evolution—A designer's perspective. AIAA/ICAS International Air and Space Symposium and Exposition. Jul. 14-16, 2003. AIAA 2003-2722. pp. 1-15.
Tapken, U., Raitor, T., and Enghardt, L. (2009). Tonal noise radiation from an UHBR fan-optimized in-duct radial mode analysis. AIAA/CEAS Aeroacoustics Conference. May 11-13, 2009. AIAA 2009-3288. pp. 1-15.

* cited by examiner

GEARED TURBOFAN ENGINE GEARBOX ARRANGEMENT

CROSS REFERENCE TO RELATED APPLICATION

This application is a continuation of U.S. patent application Ser. No. 14/496,574, filed Sep. 25, 2014, which is a divisional application of Ser. No. 14/087,471, filed Nov. 22, 2013, and entitled "Geared Turbofan Engine Gearbox Arrangement," the disclosure of which is incorporated by reference herein in its entirety as if set forth at length.

BACKGROUND

The disclosure relates to turbofan engines.

Gas turbine engines and similar structures feature a number of subassemblies mounted for rotation relative to a fixed case structure. Such engines typically have a number of main bearings reacting radial and/or thrust loads. Examples of such bearings are rolling element bearings such as ball bearings and roller bearings. Typically such bearings all react radial loads. Some such bearings also react axial (thrust) loads (either unidirectionally or bidirectionally). Ball bearings typically react thrust loads bidirectionally. However, if the inner race is configured to engage just one longitudinal side of the balls while the outer race engages the other longitudinal side, the ball bearing will react thrust unidirectionally.

Tapered roller bearings typically react thrust unidirectionally. Two oppositely-directed tapered roller bearings may be paired or "duplexed" to react thrust bidirectionally. An example is found in the fan shaft bearings of U.S. Patent Application Publication 2011/0123326A1, which is incorporated herein by reference in its entirety and which is entitled "Bellows Preload and Centering Spring for a Fan Drive Gear System".

U.S. Patent Application Publication 2013/0192198, which is incorporated herein by reference in its entirety and which entitled "Compressor Flowpath", discloses a flowpath through a compressor having a low slope angle.

For controlling aspects of the flowpath passing through the fan duct, some turbofan engines include controllable features such as variable fan blade pitch and variable area fan exhaust nozzles. U.S. Pat. No. 5,431,539, which is incorporated herein by reference in its entirety and which is entitled "Propeller Pitch Change Mechanism", and U.S. Pat. No. 5,778,659, which is incorporated herein by reference in its entirety and which is entitled "Variable Area Fan Exhaust Nozzle Having Mechanically Separate Sleeve and Thrust Reverser Actuation System", disclose respective such systems.

Unless explicitly or implicitly indicated otherwise, the term "bearing" designates an entire bearing system (e.g., inner race, outer race and a circumferential array of rolling elements) rather than the individual rolling elements. The term "main bearing" designates a bearing used in a gas turbine engine to support the primary rotating structures within the engine that produce thrust. This is distinguished, for example, from an accessory bearing (which is a bearing that supports rotating structures that do not produce thrust such as the fuel pump or oil pump bearings in an accessory gearbox).

There are several different factors influencing flowpath geometry at certain locations in the engine. Weight, material strength and aerodynamics influence desirable core flowpath radius at different locations within the compressor and turbine sections. As noted above, U.S. Patent Application Publication 2013/0192198 discloses certain advantageous aspects of flowpath geometry within a compressor. This, however, may be competing with considerations regarding the core flowpath elsewhere in the engine. For example, the presence of an actuation mechanism or variable pitch fan blades may mandate a relatively large hub diameter. Similarly, the presence of a drive gear system axially between the compressor and the fan may also cause relatively high core flowpath diameters. Normally, it may be desirable to minimize radial turning of the core flow between such high radius sections and a lower diameter compressor section downstream thereof. Of particular importance to flowpath geometry and overall engine efficiency, however, are the bearing arrangements used to support the various rotating structures; improvements in this area are, therefore, always of interest to the turbofan engine designer.

SUMMARY

A gas turbine engine according to an example of the present disclosure includes a fan section having a plurality of fan blades. The plurality of fan blades has a peak tip radius Rt and an inboard leading edge radius Rh at a first inboard boundary of a first flowpath, and a ratio of Rh to Rt being less than 0.4. A core engine includes a first turbine configured to drive a first compressor, and a fan drive turbine configured to drive the fan section. The fan drive turbine includes 5 stages, and the fan drive turbine includes fewer stages than the first compressor.

A further embodiment of any of the foregoing embodiments includes a second compressor upstream of the first compressor. The second compressor includes a greater number of stages than the first turbine.

In a further embodiment of any of the foregoing embodiments, the core engine defines a core flowpath and a longitudinal axis. A second inboard boundary of the core flowpath has a radius R1 defined at a first stage of a second compressor and a radius R2 defined at a splitter rim. Each radius R1, R2 is defined relative to the longitudinal axis. The splitter rim is configured to guide flow into the core flowpath. A ratio of R1 to R2 is greater than 0.5.

In a further embodiment of any of the foregoing embodiments, the ratio of R1 to R2 is between 0.55 and 1.0.

In a further embodiment of any of the foregoing embodiments, the ratio of Rh to Rt is less than about 0.30.

In a further embodiment of any of the foregoing embodiments, the first turbine includes two stages.

A further embodiment of any of the foregoing embodiments includes a geared architecture configured to rotate the fan section at a different speed than the fan drive turbine.

A gas turbine engine according to the example of the present disclosure includes a fan section having a plurality of fan blades configured to deliver airflow to a bypass duct, the plurality of fan blades having a peak tip radius Rt and an inboard leading edge radius Rh defined at a first inboard boundary of a first flowpath, and a ratio of Rh to Rt being less than 0.4. A core engine defines a core flowpath and a longitudinal axis. The core engine includes a first turbine configured to drive a first compressor, a second compressor, and a fan drive turbine configured to drive the fan section and arranged aft of the first turbine. A second inboard boundary of the core flowpath has a radius R1 defined at a first stage of the second compressor and a radius R2 defined at a splitter rim. Each radius R1, R2 is defined relative to the longitudinal axis. The splitter rim is configured to guide flow into the core flowpath. A ratio of R1 to R2 is greater than 0.5.

In a further embodiment of any of the foregoing embodiments, the ratio of R1 to R2 is between 0.55 and 1.0.

In a further embodiment of any of the foregoing embodiments, the ratio of Rh to Rt is less than about 0.30.

In a further embodiment of any of the foregoing embodiments, six or more turbine stages are arranged downstream of the first turbine.

In a further embodiment of any of the foregoing embodiments, the first turbine includes two stages.

A further embodiment of any of the foregoing embodiments includes a geared architecture configured to rotate the fan section at a different speed than the fan drive turbine.

A method of designing a gas turbine engine according to an example of the present disclosure includes providing a fan section having a plurality of fan blades. The fan blades have a peak tip radius Rt and an inboard leading edge radius Rh defined at a first inboard boundary of a first flowpath. A ratio of Rh to Rt is less than 0.4. The method includes providing a core engine including a first turbine configured to drive a first compressor, a second compressor, and a fan drive turbine configured to drive the fan section. The fan drive turbine includes 5 stages. The first compressor includes a greater number of stages than the fan drive turbine, and the second compressor includes a greater number of stages than the first turbine.

In a further embodiment of any of the foregoing embodiments, the ratio of Rh to Rt is less than about 0.30.

In a further embodiment of any of the foregoing embodiments, the core engine defines a core flowpath and a longitudinal axis. A second inboard boundary of the core flowpath has a radius R1 defined at a first stage of the second compressor and a radius R2 defined at a splitter rim. Each radius R1, R2 is defined relative to the longitudinal axis. The splitter rim is configured to guide flow into the core flowpath. A ratio of R1 to R2 is greater than 0.5.

In a further embodiment of any of the foregoing embodiments, the ratio of Rh to Rt is less than about 0.30.

In a further embodiment of any of the foregoing embodiments, the ratio of R1 to R2 is between 0.55 and 1.0.

A further embodiment of any of the foregoing embodiments includes providing a geared architecture configured to rotate the fan section at a different speed than the fan drive turbine.

In a further embodiment of any of the foregoing embodiments, the first turbine includes two stages.

One aspect of the disclosure involves a three-spool turbofan engine comprising a fan having a plurality of blades. A transmission is configured to drive the fan. The fan blades have a peak tip radius RT. The fan blades have an inboard leading edge radius RH at an inboard boundary of the flowpath. A ratio of RH to RT is less than about 0.40.

A further embodiment may additionally and/or alternatively include the engine being a three spool turbofan engine comprising a first spool comprising a first pressure turbine and a first shaft coupling the first pressure turbine to the transmission. A second spool comprises a second pressure turbine, a first compressor, and a second spool shaft coupling the second pressure turbine to the second spool compressor. A core spool comprises a third pressure turbine, a second compressor, and a core shaft coupling the third pressure turbine to the second compressor. A combustor is between the second compressor and the third pressure turbine.

A further embodiment may additionally and/or alternatively include the first compressor having a rear hub engaging a bearing, said bearing engaging the first shaft, and another bearing engaging the first compressor and the first shaft.

A further embodiment may additionally and/or alternatively include a ring gear of the transmission being mounted to rotate with the fan as a unit.

A further embodiment may additionally and/or alternatively include each fan blade having a leading edge and a trailing edge. A splitter is positioned along a flowpath through the engine and having a leading rim separating a core branch of the flowpath from a bypass branch of the flowpath. An inboard boundary of the core flowpath has a radius RII at an axial position of the splitter rim and a radius RI at a leading stage of blades of the first compressor. A ratio of an axial length L10 between the splitter rim and the leading stage of blades of the first compressor at the inboard boundary of the core flowpath to the radius RII is less than 1.2.

A further embodiment may additionally and/or alternatively include each fan blade having a leading edge and a trailing edge. A splitter is positioned along a flowpath through the engine and having a leading rim separating a core branch of the flowpath from a bypass branch of the flowpath. An inboard boundary of the core flowpath has a radius RII at an axial position of the splitter rim and a radius RI at a leading stage of blades of the first compressor. A ratio of the radius RI to the radius RII is greater than 0.50. The ratio of the radius RI to the radius RII may be 0.55-1.0.

A further embodiment may additionally and/or alternatively include the fan blades being non-variable.

A further embodiment may additionally and/or alternatively include a variable fan nozzle.

A further embodiment may additionally and/or alternatively include the engine having a plurality of main bearings. A first of said main bearings engages a static support and a forward hub of the second spool. A second of said main bearings engages the first shaft and the forward hub of the second spool.

A further embodiment may additionally and/or alternatively include the first bearing and the second bearing be behind the transmission.

A further embodiment may additionally and/or alternatively include a length between said first of said main bearings and a center of gravity of said rotor of the first compressor being less than half of a disk to disk overall length of the first compressor.

A further embodiment may additionally and/or alternatively include a length between said first of said main bearings and a center of gravity of a rotor of the second spool compressor being less than a radius RI of the inboard boundary of the core flowpath at a leading stage of blades of the first compressor.

A further embodiment may additionally and/or alternatively include the forward hub extending forward from a disk of the first compressor.

A further embodiment may additionally and/or alternatively include the forward hub extending forward from a bore of the disk of the first compressor.

A further embodiment may additionally and/or alternatively include the first compressor having at least one disk forward of said disk.

A further embodiment may additionally and/or alternatively include the static support passing through said at least one disk forward of said disk.

A further embodiment may additionally and/or alternatively include the first compressor having at least two disks forward of said disk.

A further embodiment may additionally and/or alternatively include said at least one disk being forward of a centerplane of the second bearing.

A further embodiment may additionally and/or alternatively include the first bearing and the second bearing being non thrust roller bearings.

A further embodiment may additionally and/or alternatively include rollers of the first bearing and the second bearing being at least partially longitudinally overlapping.

A further embodiment may additionally and/or alternatively include a separation of a transverse centerplane of the first bearing and a transverse centerplane of the second bearing being less than a radius (RB) of the first bearing.

A further embodiment may additionally and/or alternatively include a first seal sealing the first bearing and a second seal sealing the second bearing to isolate a transmission compartment ahead of the first bearing and the second bearing from a region behind the first bearing and the second bearing.

A further embodiment may additionally and/or alternatively include the transmission comprising: a sun gear mounted to rotate with the first shaft; a ring gear mounted to rotate with the fan; a plurality of intermediate gears between the sun gear and the ring gear; and a carrier holding the intermediate gears.

A further embodiment may additionally and/or alternatively include a third of said main bearings being a thrust bearing engaging the first spool shaft.

A further embodiment may additionally and/or alternatively include a fourth of said main bearings being a non thrust roller bearings bearing engaging an aft end of the first spool shaft.

A further embodiment may additionally and/or alternatively include the core shaft engaging at least two of said main bearings, and wherein at least one of said at least two of said main bearings is a thrust bearing.

A further embodiment may additionally and/or alternatively include the first pressure turbine having three to five blade stages.

A further embodiment may additionally and/or alternatively include the second spool shaft engaging at least two of said main bearings, at least one of which is a thrust bearing.

A further embodiment may additionally and/or alternatively include an inter shaft bearing axially locating the first spool shaft.

A further embodiment may additionally and/or alternatively include the first spool shaft engaging at least three of said main bearings.

A further embodiment may additionally and/or alternatively include the fan being a single stage fan.

A further embodiment may additionally and/or alternatively include the ratio of RH to RT being less than about 0.30.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

Like reference numbers and designations in the various drawings indicate like elements.

DETAILED DESCRIPTION

Figure 1:
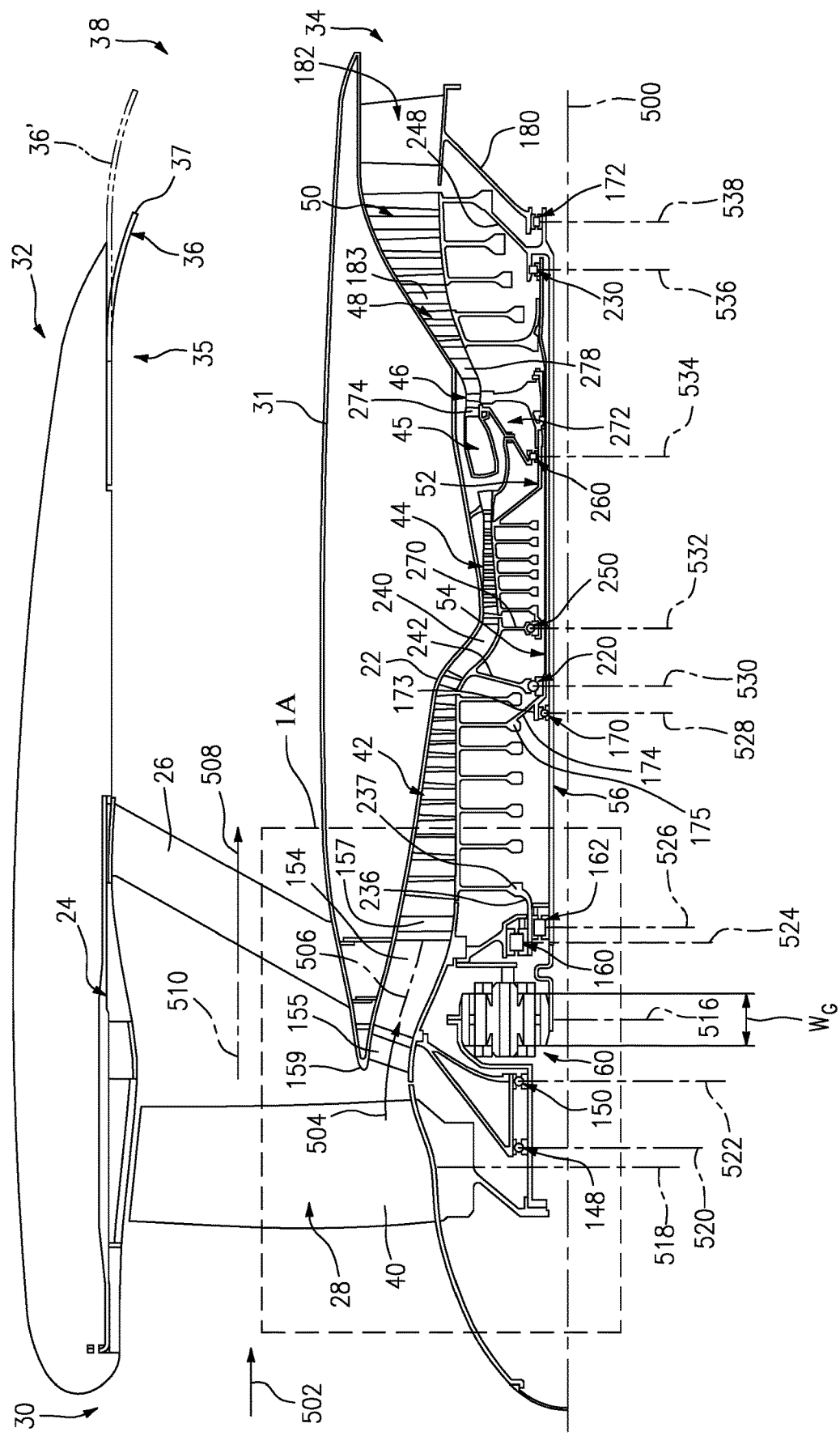
FIG. 1 is a schematic longitudinal sectional view of a first turbofan engine embodiment.

FIG. 1 shows a turbofan engine 20 having a central longitudinal axis or centerline 500. The engine has a structural case including a core case 22. The exemplary structural case further comprises a fan case 24 connected to the core case by a circumferential array of struts 26 and surrounding a fan 28. The core case and the fan case may have respective outboard aerodynamic nacelles (shown schematically as 31 and 32).

The exemplary forward rim of the fan case is proximate an engine inlet 30 receiving an inlet flow 502 when the engine is operating. The inlet flow passes downstream through the fan 28 and divides into a core flow 504 passing inboard along a core flowpath 506 (core branch of a combined flowpath) within the core case and a bypass flow 508 passing outboard along a bypass flowpath 510 (bypass branch of a combined flowpath) between the core case 22 and the fan case 24.

The bypass flowpath extends to an outlet 38. The exemplary outlet 38 is defined by a variable nozzle assembly 35. The exemplary variable nozzle assembly 35 includes a movable member 36 having a downstream/trailing end 37 for defining the outlet between the end 37 and the core nacelle 31. The exemplary member 36 may articulate between at least two conditions or positions. The exemplary articulation involves an axial translation between a forward/retracted condition or position shown in solid line and a rearward/extended condition or position shown in broken line with the numeral 36'. The translation may be driven by an actuator (not shown) (e.g., a hydraulic actuator).

The core flow 504 (or a majority portion thereof allowing for bleeds, etc.) passes sequentially through one or more compressor sections, a combustor, and one or more turbine sections before exiting a core outlet 34. In the exemplary engine the fan is a single-stage fan having a single stage of fan blades 40. Each of the compressor and turbine sections may include one or more blade stages mounted to rotate as a unit about the centerline 500. The blade stages may be alternatingly interspersed with vane stages. Each compressor section is co-spooled with an associated turbine section. From upstream to downstream along the core flowpath, the exemplary engine has two compressor sections 42 and 44, the combustor 45, and three turbine sections 46, 48, and 50. The fan and compressor sections (and their stages) progressively compress inlet air which passes into the combustor for combustion with fuel to generate gas of increased pressure which passes downstream through the turbine sections where the gas pressure is progressively reduced as work is extracted. The turbine section 46 operates at a pressure that is higher than the intermediate turbine 48 and the low turbine 50 and is often referred to as a high (or third) pressure turbine (HPT) or a core turbine. The HPT blade stages are connected via a shaft 52 ("high shaft" or "core shaft") to the blade stages of the compressor section 44 to drive that compressor section (often referred to as a high pressure compressor (HPC) or core compressor) to form a high spool or core spool.

The turbine section 48 operates at a pressure range that is intermediate to the low and high pressure sections 50 and 46. The turbine section 48 is thus often referred to as an intermediate (or second) pressure turbine (IPT). The IPT blade stages are connected via a shaft 54 ("intermediate shaft") to the compressor section 42 to drive that compressor section (often referred to as an intermediate pressure compressor (IPC)) to form an intermediate spool.

The turbine section 50 operates at a low pressure range relative to the high pressure turbine 46 and the intermediate pressure turbine 48 and is thus often referred to as a low (or first) pressure turbine (LPT) or as a fan drive turbine. The LPT blade stages are connected via a shaft 56 ("low shaft") to a transmission 60 (e.g., an epicyclic transmission, more particularly a geared system known as a fan drive gear system (FDGS)) to indirectly drive the fan 28 with a speed reduction.

An exemplary high pressure turbine 46 is a single or double stage turbine assembly (although three or more HPT stages are possible); an exemplary intermediate stage turbine 48 is a single or double stage turbine assembly (although three or more IPT stages are possible); an exemplary low pressure turbine 50 is a multi-stage turbine such as, for example, one or more stages, or more specifically three to five stages (although one or two stages is also possible).

The exemplary transmission 60 (FIG. 1A) comprises a central externally-toothed sun gear 80. The sun gear 80 is encircled by an internally-toothed ring gear 82. A number of externally toothed star or planet gears 84 are positioned between and enmeshed with the sun gear 80 and ring gear 82. The star or planet gears 84 can be referred to as intermediate gears. A cage or carrier assembly 86 carries the intermediate gears via associated bearings 88 for rotation about respective bearing axes. The exemplary bearings 88 may be rolling element bearings (e.g., ball or roller bearings) or may be journal bearings having external circumferential surface portions closely accommodated within internal bore surfaces of the associated intermediate gears 84. Regardless of the type, the bearings may be metallic (such as aluminum titanium, other metal, or an alloy of more than one metal), ceramic, composite, or other material.

The exemplary carrier assembly 86 comprises a front plate (e.g., annular) in front of the gears and a rear plate (e.g., annular) behind the gears. These plates may be mechanically connected by the bearings 88 and/or by linking portions between adjacent intermediate gears.

In the exemplary embodiment, a forward end of the low shaft 56 is coupled to the sun gear 80. The exemplary low shaft 56 has a generally rigid main portion 100 and a flexible forward portion 102. A forward end of the portion 102 may have a splined outer diameter (OD) surface interfitting with a splined inner diameter (ID) surface of the sun gear 80 to transmit rotation.

The exemplary carrier assembly 86 is substantially non rotatably mounted relative to the engine case 22. In the exemplary embodiment, the carrier assembly 86 is coupled to the case 22 via a compliant flexure 110 that allows at least small temporary radial and axial excursions and rotational excursions transverse to the centerline 500. The exemplary flexure 110 carries a circumferential array of fingers 111 engaging the carrier 86 (e.g., between adjacent gears 84). A peripheral portion of the flexure 110 is mounted to the case to resist rotation about the centerline 500. Thus, flexing of the flexure accommodates the small excursions mentioned above while holding the carrier against rotation about the centerline.

The exemplary ring 82 is coupled to the fan 28 to rotate with the fan 28 as a unit. In the exemplary embodiment a rear hub 122 of a main fan shaft 120 connects the fan 28 to the ring gear 82.

The speed reduction ratio is determined by the ratio of diameters of the ring gear 82 to the sun gear 80. This ratio will substantially determine the maximum number of intermediate gears 84 in a given ring. The actual number of intermediate gears 84 will be determined by stability and stress/load sharing considerations. An exemplary reduction is between about 2:1 and about 13:1. Although only one intermediate gear 84 is necessary, in exemplary embodiments, the number of intermediate gears 84 may be between about three and about eleven. An exemplary gear layout with fixed carrier is found in U.S. Patent Application Publication 2012/0251306A1, which is incorporated by reference herein in its entirety and which is entitled "Fan Rotor Support. In addition, although the exemplary transmission 60 is described as being of a "star" type configuration, other types of configurations (such as "planetary" systems) are within the scope of this invention.

Thus, the exemplary engine 20 has four main rotating components (units) rotating about the centerline 500: the core spool (including the high pressure turbine 46, the high shaft 52, and the high pressure compressor 44); the intermediate spool (including the intermediate pressure turbine 48, the intermediate shaft 54, and the intermediate pressure compressor 42); the low spool (including the low pressure turbine 50, low shaft 56, and the sun gear 80); and the fan assembly (including the fan 28 itself, the fan shaft 120, and the ring gear 82). Each of these four things needs to be supported against: radial movement; overturning rotations transverse to the centerline 500; and thrust loads (parallel to the centerline 500). Radial and overturning movements are prevented by providing at least two main bearings engaging each of the four units.

Each unit would have to also engage at least one thrust bearing. The nature of thrust loads applied to each unit will differ. Accordingly, the properties of the required thrust bearings may differ. For example, the fan 28 primarily experiences forward thrust and, therefore, the thrust bearings engaging the fan 28 may be configured to address forward thrust but need not necessarily address rearward thrusts of similar magnitudes, durations, etc.

The FIG. 1 embodiment has two main bearings 148, 150 along the fan shaft forward of the transmission 60. Inboard, the inner race of each bearing 148, 150 engages a forward portion of the shaft 120 aft of the fan 28. Outboard, the outer race of each bearing 148, 150 engages static structure of the case. The exemplary static structure comprises a support 152 extending inward and forward from a forward frame 154. These two bearings 148, 150 thus prevent radial excursions and overturning moments which the fan 28 may produce during flight.

To resist thrust loads, one or both of the bearings 148, 150 may be thrust bearings. In an exemplary embodiment, both are thrust bearings (schematically shown as ball bearings). Both may be thrust bearings because there may typically be no differential thermal loading (and thus thermal expansion) of the support 152 relative to the shaft 120 between these bearings. Where the two coupled structures are subject to differences in thermal expansion, it may be desirable to have only one bearing be a thrust bearing.

In one alternative example of a single thrust bearing and a single non thrust bearing, the bearing 150 would be a straight roller bearing with longitudinal roller axes configured to only handle radial loads. The other bearing (i.e., the bearing 148) would be a thrust bearing. Due to the significance of forward thrust loads on the fan 28, the bearing 148 may be biased to resist forward loads. The exemplary bearing 148 may then be a bidirectional ball bearing or a bidirectional tapered roller bearing (e.g., wherein the rollers have a forward taper and forwardly converging roller axes to preferentially handle the forward thrust loads). A similar bidirectional tapered roller bearing is shown in U.S. Pat. No. 6,464,401 of Allard, which is incorporated herein by reference in its entirety and which is entitled "High Load Capacity Bi Directional Tapered Roller Bearing". Ball bearings are typically bidirectional thrust bearings. However, a unidirectional ball bearing may be formed by having at least one of the races contacting only a single longitudinal side of the balls.

An exemplary bearing arrangement for supporting the remaining three units is discussed below. Various aspects of each of these may be independently implemented or all may be implemented in a given engine.

The exemplary low shaft 56 is principally radially supported by a forward bearing 162, an intermediate bearing 170, and an aft bearing 172. The exemplary forward bearing 162 is indirectly radially grounded to the case 22. An exemplary indirect grounding (discussed further below) is via the intermediate spool and bearing 160. The exemplary bearing 160 (FIG. 1A) is directly radially grounded to the case (e.g., by a bearing support 164 extending inward from a frame 154 aft of the support 152). FIG. 1 also shows an inlet guide vane array 155 immediately upstream of the struts of the frame 154 and an outlet guide vane array 157 immediately downstream of the frame 154 and upstream of the leading compressor stage. In exemplary implementations, the vanes of the array 157 may be variable vanes. The exemplary array 155 is immediately downstream of a splitter 159 dividing the core flowpath from the bypass flowpath.

The exemplary bearing 170 intervenes directly between the low spool and intermediate spool at an intermediate location. In the exemplary embodiment, it is indirectly radially grounded by the bearing 220. The bearing 220 is directly radially grounded by a support 240 extending radially inward from a structural vane array (frame) 242 between the compressor sections 42 and 44.

The exemplary aft bearing 172 is directly radially grounded to the case 22 via a support 180 extending inward from a frame 182 extending across the core flowpath 504. The exemplary support 180 is aft of the LPT 50 with the frame 182 being a turbine exhaust frame. Alternative implementations may shift the support 180 forward of the LPT 50 to engage an inter turbine frame 183 between the turbine sections 48 and 50.

In the exemplary embodiment, the bearings 162 and 172 are non thrust roller bearings (e.g., straight roller bearings). The bearing 170 serves as inter-shaft thrust bearing (e.g., a bidirectional ball bearing) having an inner race engaging an intermediate portion of the low shaft 56 and an outer race engaging the intermediate shaft 54 to indirectly axially ground the low shaft 56 to the case 22 via the intermediate shaft 54.

By locating the bearing 170 relatively axially close to the bearing 220, the bearing 170 may also provide an intermediate location of radial grounding in addition to the forward and aft radial groundings provided by the bearings 162 and 172. Alternative implementations might eliminate or reduce the amount of this radial grounding. In the FIG. 1 example, the bearings 160 and 162 are stacked so close as to be partially axially overlapping (i.e., axial overlap of their rollers) to provide a high degree of radial support.

In contrast, there is a slight non overlap forward shift of the bearing 170 relative to the bearing 220. In the exemplary engine, the outer race of the bearing 170 engages a forwardly projecting support extending forward from a rear hub 174 of the compressor section 42. The exemplary rear hub 174 extends from a bore 175 of one of the disks of the compressor section 42. Slight flexing of the hub 174 and the outer bearing support 173 protruding therefrom may provide a little more radial compliance than associated with the forward bearing 162.

The intermediate spool is supported by forward bearing 160, intermediate bearing 220, and an aft bearing 230. In an exemplary embodiment, forward bearing 160 is a non thrust roller bearing providing radial retention only. The inner race of the bearing 160 (and outer race of the bearing 162) are mounted along respective outer and inner faces of a hub or support 236 extending forward from the bore 237 of one of the disks of the compressor section 42 (e.g., the first (upstream most) disk). The exemplary intermediate bearing 220 is a bidirectional thrust bearing (e.g., ball bearing) directly radially and axially supporting/grounding the intermediate spool via the support 240 extending to the inter compressor frame 242 between the compressor sections 42 and 44. The bearing 230 indirectly radially supports/grounds the intermediate spool by engaging the intermediate spool and the low spool. In the exemplary embodiment, the inner race of the bearing 230 engages a portion of the intermediate shaft aft of the turbine section 48 and the outer race of the bearing 230 engages a support extending forward from a hub 248 of the LPT 50. The exemplary hub 248 extends forward from the bore of a disk (e.g., the last or downstream most disk) of the LPT.

The radial loads on the intermediate spool at the bearing 230 will primarily be transmitted to the low shaft 56 and through an aft portion of the low shaft 56 to the bearing 172 and grounded by the support 180 and frame 182. Axial (thrust) loads will pass through the bearing 220.

Thus, thrust loads on the low spool are transmitted via the shaft 56 through the bearing 170, through the intervening portion of the intermediate shaft/spool, to the bearing 220, and grounded back through the support 240.

The core spool may be fully directly supported by two bearings 250 and 260 of which at least one would be a thrust bearing. In the exemplary embodiment, the bearing 250 is a forward bearing grounding a forward portion of the core shaft ahead of the compressor section 44 to the inter compressor frame 242 via a support 270. The aft bearing 260 grounds a portion of the core shaft intermediate the compressor section 44 and turbine section 46 via a support 272 extending to a combustor frame 274 ahead of the turbine section 46. In alternative embodiments, this aft bearing 260 may be shifted aft of the turbine section 46 via a support (not shown) to an inter turbine frame 278 between the sections 46 and 48. In the exemplary implementation, the bearing 250 is a thrust bearing (e.g., a bidirectional ball bearing with its inner race engaging the core spool and its outer race engaging the support 270). The exemplary bearing 260 is a straight roller bearing with its inner race engaging the core shaft 52 and its outer race engaging the support 272. The exemplary support 270 extends to a rear portion of the frame 240 aft of the support 242. The exemplary inner race of the bearing 250 is mounted to a hub or support extending forward from a bore of a disk (e.g., the upstream most disk) of the compressor section 44.

FIG. 1 further shows the transmission 60 as having a centerplane 516 and the gears as having a gear width WG and the fan blade array as having a centerplane 518. From fore to aft, the bearings have respective centerplanes 520, 522, 524, 526, 528, 530, 532, 534, 536, and 538.

As discussed above, an exemplary embodiment places the centerplanes 524 and 526 of the bearings 160 and 162 relatively close to each other so as to best transmit radial loads from the low shaft 56 to the case. An exemplary separation between the planes 524 and 526 (FIG. 1A) in such embodiments is less than the characteristic radius of the bearing 160 (e.g., radius RB relative to the axis 500 of the intersections of the individual rolling element axes with the bearing centerplane). In contrast, the exemplary embodiment has a greater separation between the centerplanes 528 and 530 of the bearings 170 and 220. This may provide a greater radial compliance at the associated intermediate location.

Figure 1A:
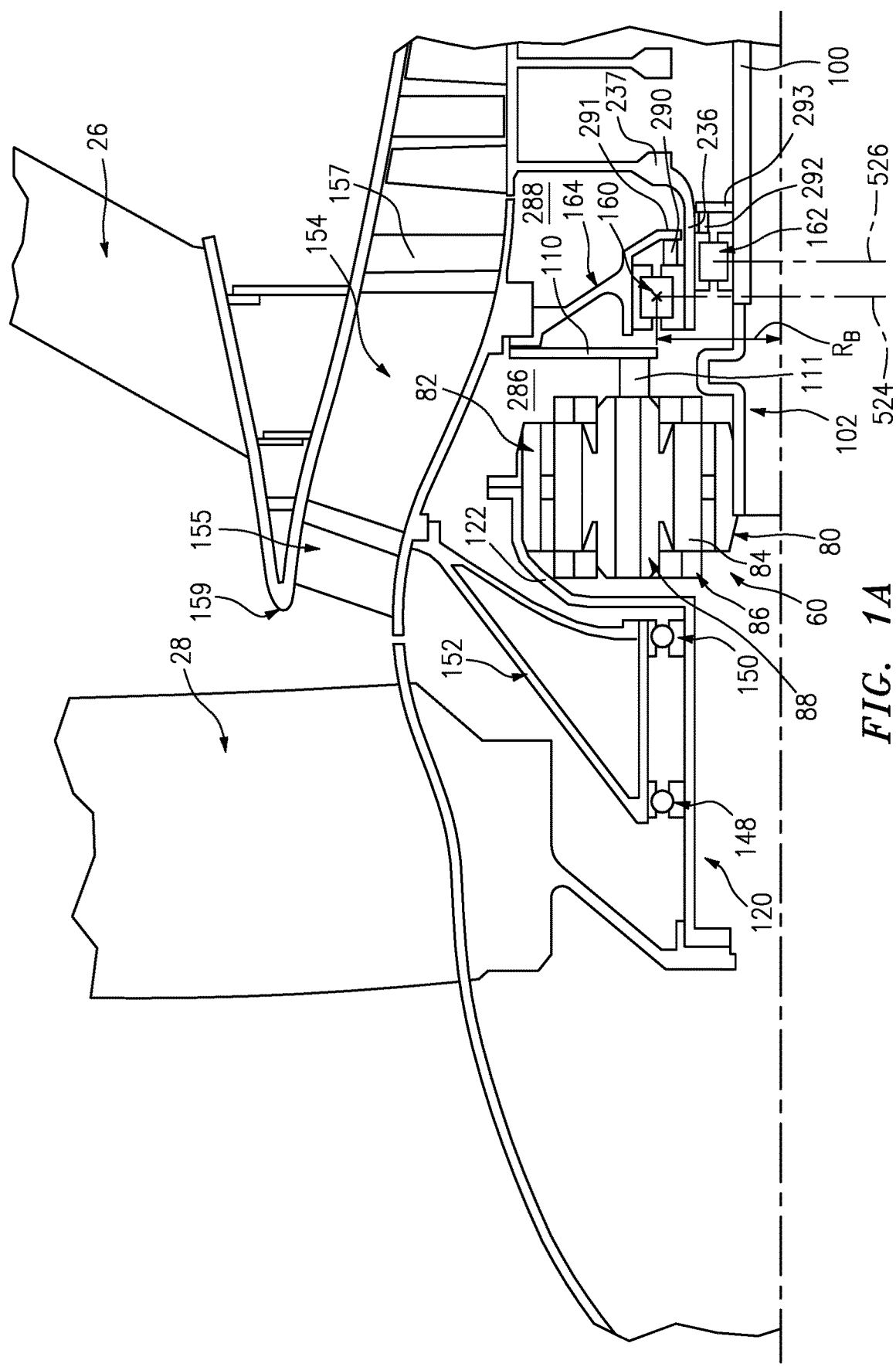
FIG. 1A is an enlarged view of a forward portion of the engine of FIG. 1.

FIG. 1A further shows a transmission compartment 286 containing the transmission 60. Aftward, the transmission compartment is largely bounded by the support 164 and bearings 160 and 162. Seals may be provided to seal the transmission compartment 286 from a region 288 (e.g., a compressor compartment) aft thereof. The exemplary seals comprise an outer seal 290 sealing between the static structure and the intermediate spool and an inner seal 292 sealing between the intermediate spool and the low spool. Exemplary seal 290 is held by a carrier 291. An exemplary carrier 291 is formed as an inward and aftward extension of the support 164 holding the seal 290 in sliding/sealing engagement with the low spool (e.g., with an inner race of the bearing 160). Similarly, a seal carrier 293 carries the exemplary seal 292. In the exemplary embodiment, the seal carrier 293 is mounted to or formed as a portion of the low shaft main portion 100 holding the seal 292 in sealing and sliding engagement with the intermediate spool (e.g., with an outer race of the bearing 162). In alternative implementations, the carrier and seal elements of one or both of the sealing systems may be reversed (e.g., the seal carrier 293 could be formed as a portion of the hub 236 holding the seal 292 in sliding/sealing engagement with the low spool).

Figure 2:
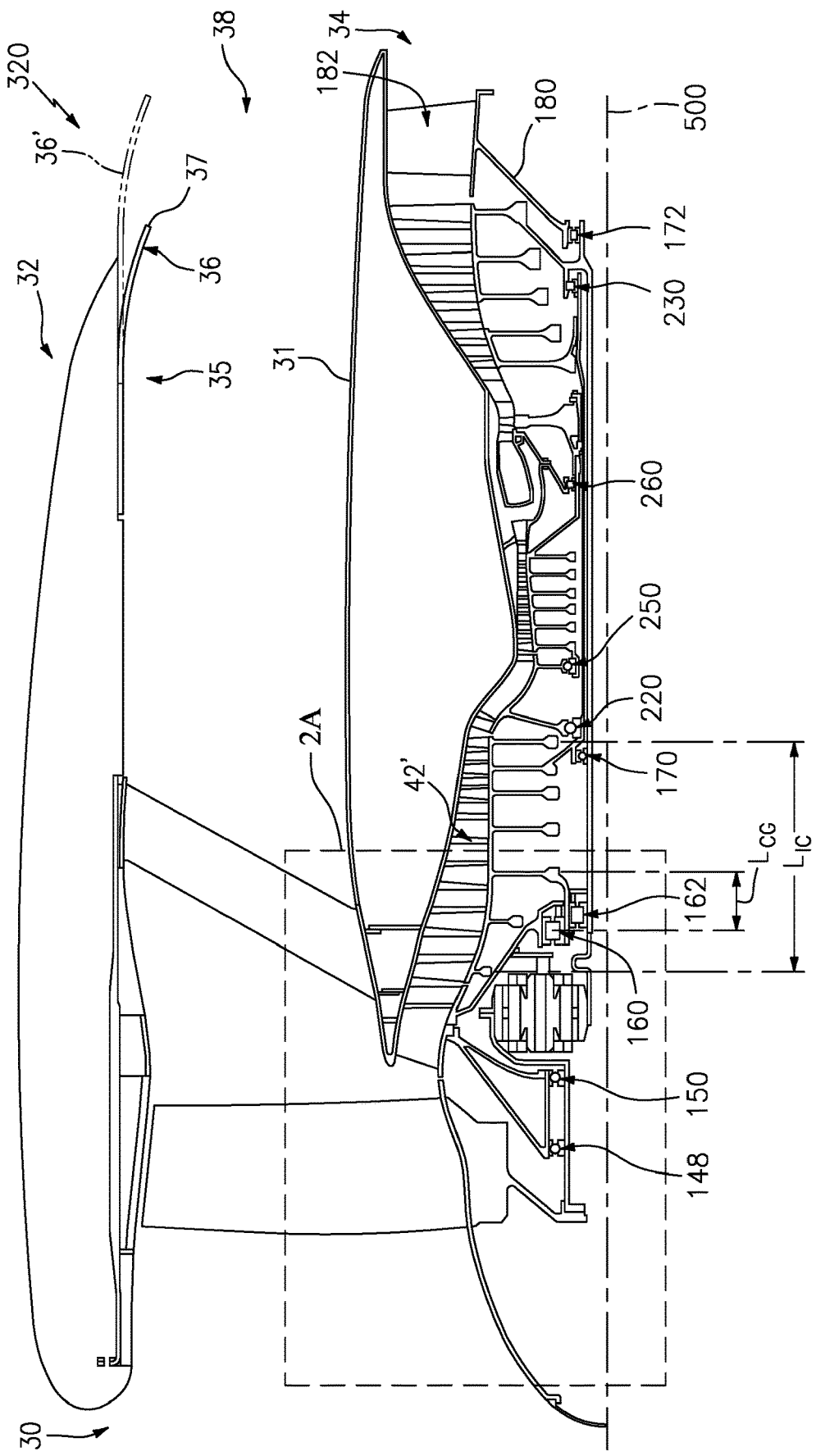
FIG. 2 is a schematic longitudinal sectional view of a second turbofan engine embodiment.

FIG. 2 shows an alternate embodiment 320 which may be otherwise similar to the engine 20 but which has a forward shift of its compressor section 42' relative to the compressor section 42 of FIG. 1. The exemplary forward shift may be achieved by having the hub or support structure 236 (FIG. 2A) that cooperates with the bearings 160 and 162 extend forward from the bore 237' of an intermediate disk of the compressor section 42' in distinction to the extension from the upstream most disk of the compressor section 42. In the exemplary engine 320, the hub 236 (FIG. 2A) extends from the third disk leaving two disks and their associated blade stages thereahead. The exemplary shift shifts at least one disk stage forward of the bearings 160 and/or 162. In this example, the longitudinal position of the first disk (e.g., measured by the centerplane of its web and/or bore) is shifted ahead of the centerplanes of the bearings 160 and 162. An exemplary shift places the first disk ahead of both bearings 160 and 162 and the second disk ahead of only the bearing 162. However, other locations and combinations are possible.

Figure 2A:
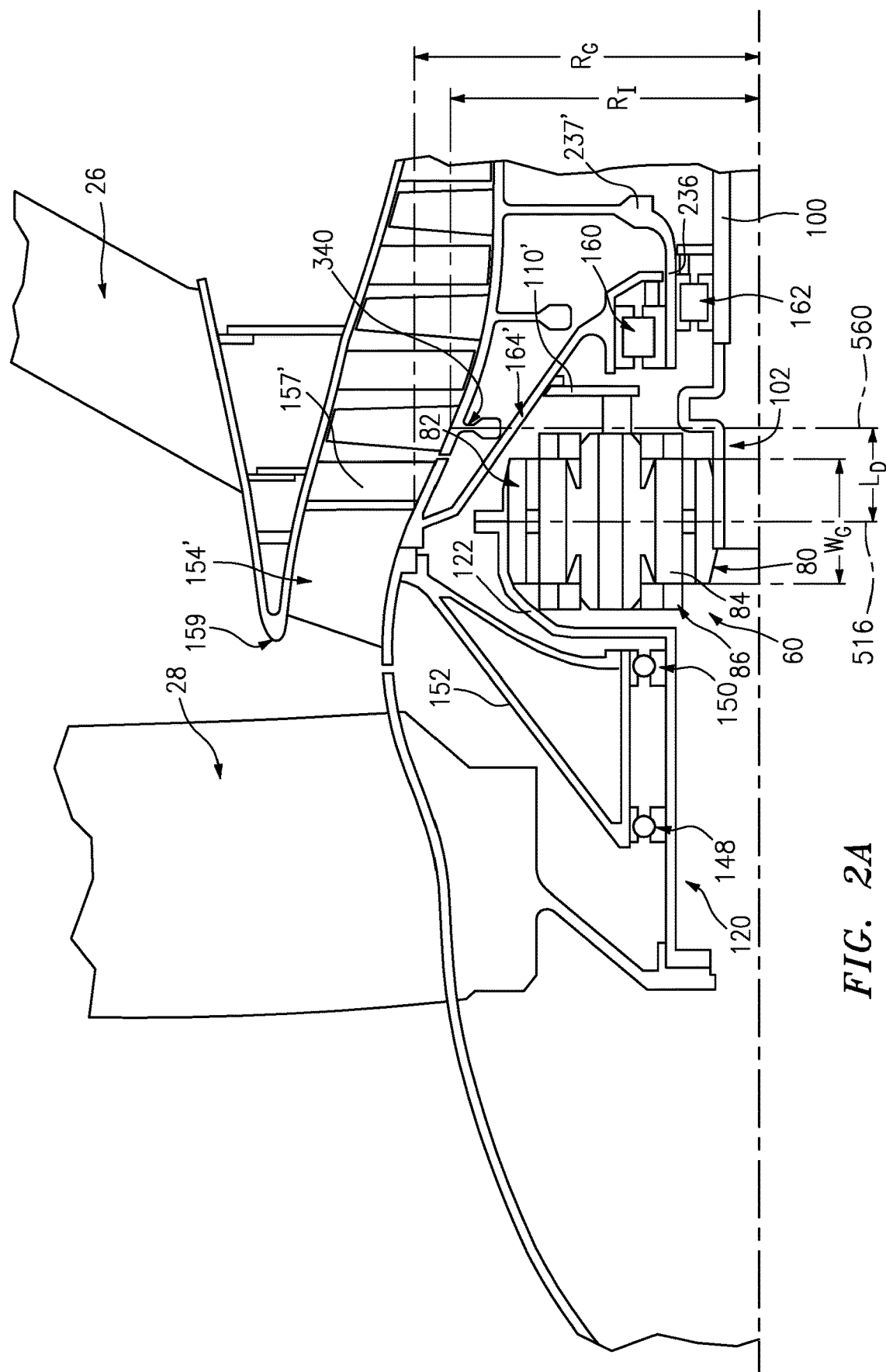
FIG. 2A is an enlarged view of a forward portion of the engine of FIG. 2.

A further characterization of the longitudinal compactness involves the relationship between the first disk and the transmission. FIG. 2A shows a centerplane 560 of the first disk 340. The centerplane 560 is behind the gear centerplane 516 by a length LD. Exemplary LD is 2.0 times the gear width WG or less, more particularly, 1.5 times WG or less. Alternatively characterized, exemplary LD is 60% or less of the core flowpath inboard radius RI at the disk centerplane 560, more particularly, 50% or less or 35% or less of RI.

Yet alternatively characterized relative to such a core flowpath inboard radius RG at the gear centerplane 516, exemplary LD is 50% of RG or less, more particularly, 40% or less or 30% or less.

To further facilitate longitudinal compactness, relative to the engine 20, the engine 320 axially shrinks the frame 154' relative to the frame 150. In this example, the frame 154' and its associated struts replace both the frame 154 and its associated struts and the inlet guide vane array 155 (FIG. 1A). The guide vane array 157 (FIG. 1A) downstream of the struts is effectively shifted forward to become 157'. Along with the foreshortening of the frame 154', the outboard periphery and mounting location of the support 164 is shifted forward and outward to become 164'. Thus, the exemplary support 164' is shallower than support 164 and partially overarches the span of the transmission gears. Because of this overarching, the fingered flexure 110 is shifted to be mounted to a mounting feature (e.g., flange) 110' along the support 164'.

Figure 3:
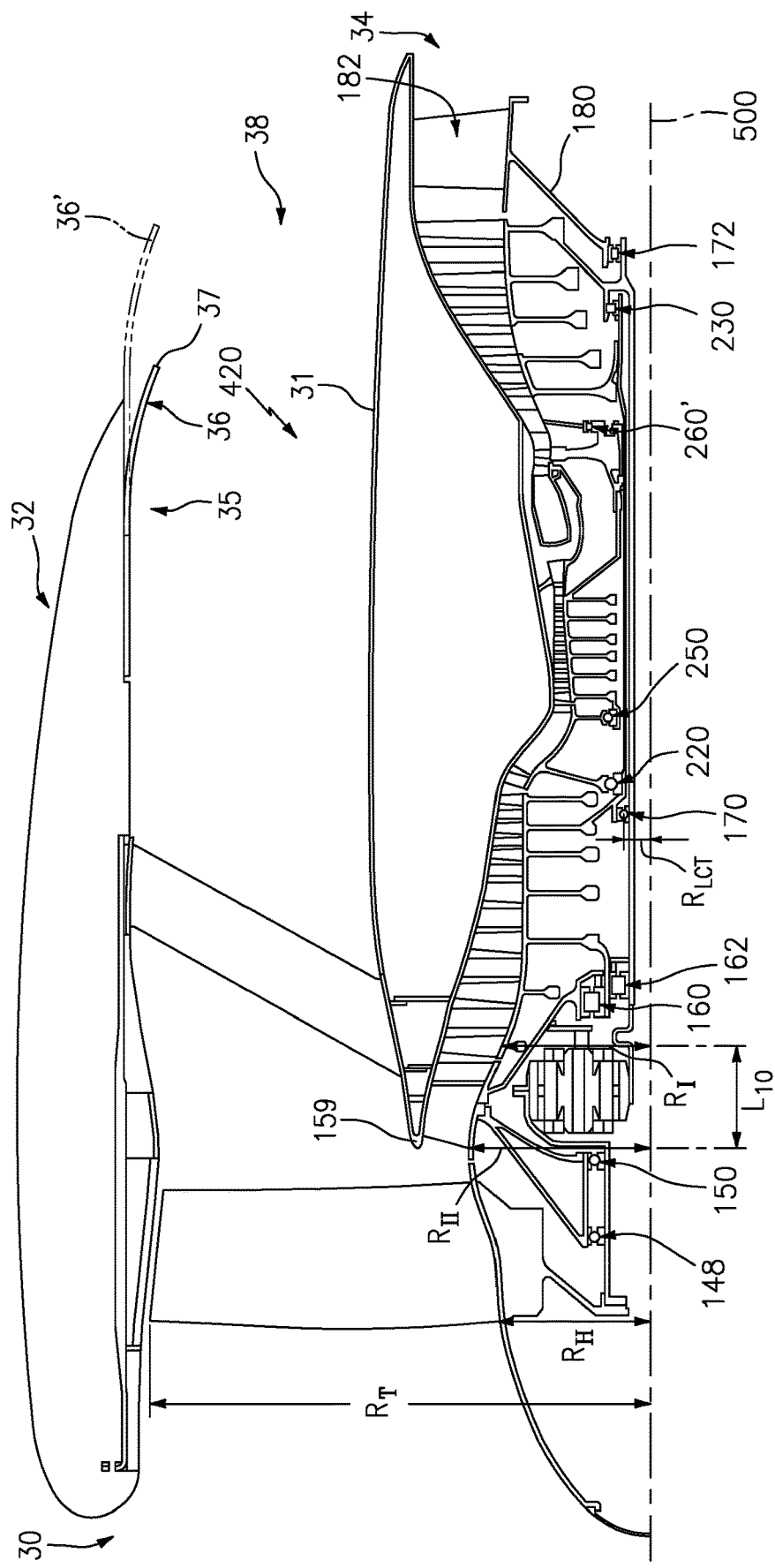
FIG. 3 is a schematic longitudinal sectional view of a third turbofan engine embodiment.
Figure 4:
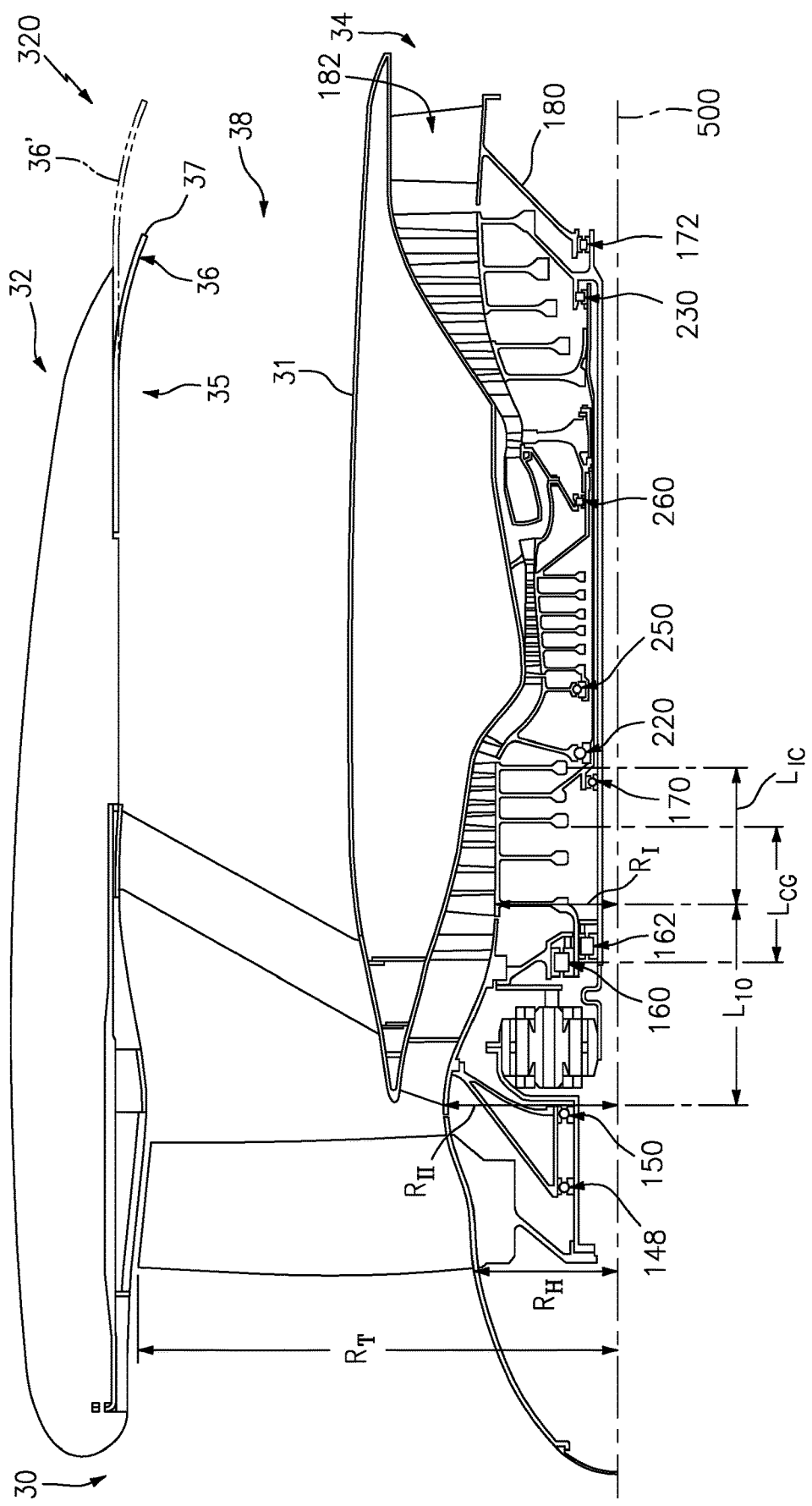
FIG. 4 is a schematic longitudinal sectional view of a fourth turbofan engine embodiment.

FIG. 3 shows yet a further embodiment 420 reflecting the variation discussed above wherein the bearing 260 is shifted aft of the high pressure turbine section 46. Other variations might add a second intermediate spool. Other variations include unducted fans. Other variations include multi stage fans. FIG. 4 shows an axially compact engine lacking the forward shift of the FIG. 3 embodiment but, instead, being otherwise similar to FIG. 1 from the leading compressor disk forward. LPC stage count, however, is reduced relative to the FIG. 1 embodiment so that the rear end of the LPC is shifted forward relative to the FIG. 1 embodiment as is the rear end of the LPC of the FIG. 3 embodiment.

FIG. 4 further shows various radial measurements. A fan tip radius is shown as RT. In this exemplary embodiment, the tip maximum radius is at the blade leading edge. FIG. 4 further shows a characteristic hub radius RH. Exemplary RH is defined as the flowpath inboard or inner diameter (ID) radius at the fan blade leading edge. FIG. 4 further shows a core inlet inner radius RII which is measured as the inboard or ID radius of the core flowpath at the axial position of the forward rim of the splitter 159. A characteristic compressor inlet radius may be measured as the aforementioned RI. Alternatively, this radius may be measured at the leading edge of the associated upstreammost blade stage. These will typically be very close to each other.

FIG. 4 further shows an axial length L10 between the locations at which RII and RI are measured. FIGS. 2 and 4 also label a length LCG between a centerplane of the bearing 160 which may represent the closest main bearing behind the FDGS, the forwardmost bearing intervening directly (between the intermediate spool and the case or both) and the transverse plane of the center of gravity of the intermediate pressure compressor rotor (e.g., ignoring the intermediate pressure shaft aft of the bearing 170 and ignoring the intermediate pressure turbine rotor). A characteristic intermediate pressure compressor length LIC is shown as the center to center axial distance between the leading and trailing disks. Particularly, with the forward shifting of the IPC of the embodiments of FIGS. 2 and 3 but also with the foreshortening of the embodiment of FIG. 4, LCG may be reduced relative to FIG. 1. The exemplary LCG may be reduced to less than RII and even to less than RI. LCG may also be reduced to less than one half of LIC (e.g., as shown in FIGS. 2 and 3). The particular reconfiguration of FIGS. 2 and 3 helps bring the center of gravity close to the plane of the bearing 160 to maintain stability. This stability reduces the radial loads that must be reacted by the bearing 220. Thus, the bearing 170 may be more specifically configured for reacting thrust loads with less capacity to react radial loads and may be lightened.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic configuration, details of such configuration or its associated environment may influence details of particular implementations. Accordingly, other embodiments are within the scope of the following claims.

What is claimed is:

1. A gas turbine engine comprising:
 a fan section including a fan having a plurality of fan blades that deliver airflow to a bypass duct, the plurality of fan blades each having a leading edge, a trailing edge, a peak tip radius Rt defined at the leading edge and an inboard leading edge radius Rh defined at a first inboard boundary of a first flowpath at the leading edge, and a ratio of Rh to Rt being less than 0.4; and
 a core engine including a first turbine that drives a first compressor, and a fan drive turbine that drives the fan section, the fan drive turbine including 5 stages, and the fan drive turbine including fewer stages than the first compressor;
 a second compressor;
 wherein the fan section has only a single fan stage comprising the fan;
 wherein the core engine defines a core flowpath and a longitudinal axis;
 wherein a second inboard boundary of the core flowpath has a radius R1 defined at a first stage of the second compressor and has a radius R2 defined at a splitter rim, each radius R1, R2 are defined relative to the longitudinal axis, and the splitter rim guides flow into the core flowpath; and
 wherein a ratio of an axial length $L_{10}$ between the radii R1, R2 to the radius R2 is less than 1.2.

2. The gas turbine engine as recited in claim 1, wherein the second compressor is upstream of the first compressor, and the second compressor includes a greater number of stages than the first turbine.

3. The gas turbine engine as recited in claim 1, wherein: the ratio of R1 to R2 is greater than 0.5.

4. The gas turbine engine as recited in claim 3, wherein the ratio of R1 to R2 is between 0.55 and 1.0.

5. The gas turbine engine as recited in claim 3, wherein the ratio of Rh to Rt is less than 0.30.

6. The gas turbine engine as recited in claim 5, wherein the first turbine includes two stages.

7. The gas turbine engine as recited in claim 1, comprising a geared architecture that rotates the fan section at a different speed than the fan drive turbine.

8. The gas turbine engine as recited in claim 6, wherein: the second compressor is upstream of the first compressor and is downstream of the fan, the second compressor including a greater number of stages than the first turbine, and the fan drive turbine drives each stage of the second compressor; and
 the ratio of R1 to R2 is between 0.55 and 1.0.

9. A gas turbine engine comprising:
 a fan section including a fan having a plurality of fan blades that deliver airflow to a bypass duct, the plurality of fan blades each having leading edge, a trailing edge, a peak tip radius Rt defined at the leading edge and an inboard leading edge radius Rh defined at a first inboard boundary of a first flowpath at the leading edge, and a ratio of Rh to Rt being less than 0.4;
 a core engine defining a core flowpath and a longitudinal axis, the core engine including a first turbine that drives a first compressor, a second compressor, and a fan drive turbine that drives the fan section and arranged aft of the first turbine;
 wherein a second inboard boundary of the core flowpath has a radius R1 defined at a first stage of the second compressor and a radius R2 defined at a splitter rim, each radius R1, R2 defined relative to the longitudinal axis, the splitter rim guides flow into the core flowpath, and a ratio of R1 to R2 is greater than 0.5;
 wherein the tan section has only a single fan stage comprising the fan; and
 wherein a ratio of an axial length $L_{10}$ between the radii R1, R2 to the radius R2 is less than 1.2.

10. The gas turbine engine as recited in claim 9, wherein the ratio of R1 to R2 is between 0.55 and 1.0.

11. The gas turbine engine as recited in claim 10, wherein the ratio of Rh to Rt is less than 0.30.

12. The gas turbine engine as recited in claim 9, wherein six or more turbine stages are arranged downstream of the first turbine.

13. The gas turbine engine as recited in claim 12, wherein the first turbine includes two stages.

14. The gas turbine engine as recited in claim 9, comprising a geared architecture that rotates the fan section at a different speed than the fan drive turbine.

15. The gas turbine engine as recited in claim 11, wherein: the second compressor is upstream of the first compressor and is downstream of the fan, the second compressor including a greater number of stages than the first turbine, and the fan drive turbine drives each stage of the second compressor.

16. The gas turbine engine as recited in claim 15, wherein: the first turbine includes two blade stages; and
 six or more turbine blade stages are arranged downstream of the first turbine.

17. A method of designing a gas turbine engine comprising:
 providing a fan section including a fan having a plurality of fan blades that deliver airflow to a bypass duct, the fan blades each having a leading edge, a trailing edge, a peak tip radius Rt defined at the leading edge and an inboard leading edge radius Rh defined at a first inboard boundary of a first flowpath at the leading edge, and a ratio of Rh to Rt being less than 0.4; and
 providing a core engine including a first turbine that drives a first compressor, a second compressor, and a fan drive turbine that drives the fan section, the fan drive turbine including 5 stages, the first compressor including a greater number of stages than the fan drive turbine, and the second compressor including a greater number of stages than the first turbine;
 wherein the fan section has only a single fan stage comprising the fan;

wherein the core engine defines a core flowpath and a longitudinal axis;

wherein a second inboard boundary of the core flowpath has a radius R1 defined at a first stage of the second compressor and has a radius R2 defined at a splitter rim, each radius R1, R2 defined relative to the longitudinal axis, the splitter rim guides flow into the core flowpath; and wherein a ratio of an axial length $L_{10}$ between the radii R1, R2 to the radius R2 is less than 1.2.

18. The method as recited in claim 17, wherein the ratio of Rh to Rt is less than 0.30.

19. The method as recited in claim 17, wherein: a ratio of R1 to R2 is greater than 0.5.

20. The method as recited in claim 19, wherein the ratio of Rh to Rt is less than 0.30.

21. The method as recited in claim 20, wherein the ratio of R1 to R2 is between 0.55 and 1.0.

22. The method as recited in claim 21, comprising providing a geared architecture that rotates the fan section at a different speed than the fan drive turbine.

23. The method as recited in claim 17, wherein the first turbine includes two stages.

\* \* \* \* \*